United States Patent
Knaub et al.

(10) Patent No.: US 6,455,165 B1
(45) Date of Patent: Sep. 24, 2002

(54) LAMINATE OF OLEFINIC UNSATURATED CONTAINING POLYMERS AND ACTIVE HYDROGEN CONTAINING POLYMERS

(75) Inventors: Philippe M. Knaub, Lake Jackson, TX (US); Zenon Z. Lysenko, Midland, MI (US); Debkumar Bhattacharjee; David E. Schiff, both of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/575,319

(22) Filed: May 19, 2000

Related U.S. Application Data

(63) Continuation of application No. 08/824,939, filed on Mar. 27, 1997, now abandoned.

(51) Int. Cl.$^7$ ............................................... B32B 27/06
(52) U.S. Cl. ................................. 428/424.7; 428/423.1; 428/423.7; 428/424.2; 428/492; 428/500
(58) Field of Search ............................. 428/500, 424.7, 428/492, 424.2, 423.7, 423.1

(56) References Cited

U.S. PATENT DOCUMENTS

| | | | |
|---|---|---|---|
| 2,837,458 A | 6/1958 | Coleman | 154/139 |
| 2,905,582 A | 9/1959 | Coleman et al. | 154/139 |
| 3,198,692 A | 8/1965 | Bridgeford | 161/188 |
| 3,453,173 A | 7/1969 | Isley et al. | 161/190 |
| 4,218,543 A | 8/1980 | Weber et al. | 521/51 |
| 4,269,945 A | 5/1981 | Vanderhider et al. | 521/159 |
| 4,373,009 A | 2/1983 | Winn | 428/424.2 |
| 4,374,210 A | 2/1983 | Ewen et al. | 521/159 |
| 4,910,279 A | 3/1990 | Gillis et al. | 528/49 |
| 5,736,748 A | 4/1998 | Lysenko et al. | 252/182.26 |

OTHER PUBLICATIONS

American Chemical Society, vol. 49, E.P. Kohler et al.; "An Apparatus for Determining Both the Quantity of Gas Evolved and the Amount of Reagent Consumed in Reactions with Methyl Magnesium Iodide"; pp. 3181–3188 (1927).

Designation: D413–82 (Reapproved 1999); "Standard Test Methods for Rubber Property–Adhesion to Flexible Substrate"; pp. 54–58.

C.H. Grundmann et al.; The Nitrile Oxides: Versatile Tools of Theoretical and Preparative Chemistry; pp. 62–67.

A.P. Bobrov et al.; Unpublished Russian Patent Application; "Glue Composition"; Received on Aug, 21, 1995; Described in Supplemental Information Disclosure Statement filed Jul. 9, 2001.

*Primary Examiner*—Blaine Copenheaver
*Assistant Examiner*—Christopher Paulraj
(74) *Attorney, Agent, or Firm*—Norman L Sims

(57) ABSTRACT

The invention is a laminate structure comprising two or more layers of one or both of a) a polymeric layer containing olefinic unsaturation; and
b) a polymeric layer having active hydrogen atoms; wherein,
c) an adhesive layer is located between the layers derived from one or more compounds having one or more nitrile oxide moieties;

wherein a portion of the nitrile oxide moieties, or derivatives thereof, is reacted with olefinic unsaturation of layer a), the active hydrogen atoms of layer b or both.

9 Claims, No Drawings

LAMINATE OF OLEFINIC UNSATURATED CONTAINING POLYMERS AND ACTIVE HYDROGEN CONTAINING POLYMERS

This application is a Continuation of prior application Ser. No.: 08/824,939 filed on Mar. 27, 1997, abandoned.

BACKGROUND OF INVENTION

This invention relates to laminates having one layer of an olefinic unsaturation containing polymer and a second layer containing an active hydrogen containing polymer. The invention also relates to processes for the preparation of such laminates.

Due to the different chemical nature of polymers having olefinic unsaturation, such as rubber, and polymers having active hydrogen atoms, such as polyurethanes, it is difficult to form laminates from such polymers. One difference is the difference in surface energy of the polymers with the olefinic unsaturation containing polymers having a low surface energy and the active hydrogen containing polymers having a high surface energy. For instance, it is desirable to improve the performance of rubber based structures, such as tires, by bonding an elastomeric layer such as a polyurethane layer to the rubber layer. Unfortunately there are no elegant means for doing this.

What is needed is an adhesive which can bond a layer of an olefin containing polymer, such as rubber, to a layer of an active hydrogen containing polymer, such as a polyurethane. What is also needed is a process for bonding such layers together. What is needed is a laminate having a layer of an olefin containing polymer, such as rubber, and a layer of an active hydrogen containing polymer, such as a polyurethane.

SUMMARY OF INVENTION

The invention is a laminate structure comprising two or more layers of one or both of
  a) a polymeric layer containing olefinic unsaturation; and
  b) a polymeric layer having active hydrogen atoms; wherein,
  c) an adhesive layer is located between the layers derived from one or more compounds having one or more nitrile oxide moieties;
wherein a portion of the nitrile oxide moieties, or derivatives thereof, is reacted with olefinic unsaturation of layer a), the active hydrogen atoms of layer b) or both.

In another embodiment the invention is a process for the preparation of such a laminate which comprises
  i. contacting one or more layers of one or both of a) a polymeric layer containing olefinic unsaturation; and b) a polymeric layer having active hydrogen atoms; wherein c) an adhesive layer derived from one or more compounds having nitrile oxide moieties is located between the two layers; and
  ii. heating the contacted layers to a temperature and under conditions such that the nitrile oxide moieties, or derivatives thereof react with one or both of the olefinic unsaturation of layer a) and the active hydrogen containing layer b).

The process of the invention allows relatively easy preparation of the laminates of the invention. The laminates exhibit properties attributable to the layers present. Such laminates are useful as tires, belts and hoses, for example.

DETAILED DESCRIPTION OF THE INVENTION

One or more layers of the laminate of the invention can be a polymer layer containing olefinic unsaturation.

Any polymer having olefinic unsaturation which is capable of reacting with a nitrile oxide moiety can be used in this invention. Preferable polymers containing olefinic unsaturation include rubber compositions, styrene-butyl rubber compositions, neoprene, ethylene-propylene terpolymers (prepared from ethylene-propylene-diene monomers, EPDM), monovinylidene aromatic monomer-conjugated diene block copolymers (such as block copolymers of styrene with butadiene or isoprene), polybutadiene, polyisoprene polychloroprene and the like. More preferred polymers containing olefinic unsaturation include rubber compositions, styrene-butyl rubber compositions, neoprene, ethylene-propylene terpolymers, monovinylidene aromatic monomer-conjugated diene block copolymers. Most preferred are natural rubber compositions and styrene-butyl rubber compositions. In one embodiment this polymeric layer may comprise a blend of polymers which contains at least one polymer with olefinic unsaturation. Preferably the polymer containing olefinic unsaturation has the olefinic unsaturation at the terminus of the polymer chain, i.e. has terminal olefinic unsaturation.

The other polymer layer may comprise a polymer having active hydrogen atoms which are reactive with nitrile oxide moieties or derivatives of such moieties. An example of such a derivative is an isocyanate moiety formed by the rearrangement of a nitrile oxide. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, —COCH$_2$CO—, —NHCONH—, —OCONH and —CONH—. Typical active hydrogen containing polymeric layers include polyurethanes having residual active hydrogen containing moieties, polyols, polyamines, polymercaptans polyacids, polymers derived from acrylics and methacrylics, and styrene-acrylate based random copolymers. Suitable Imino-functional compounds are those which have at least one terminal imino group per molecule, such as are described, for example, in U.S. Pat. No. 4,910,279, which is hereby incorporated by reference in its entirety. Preferably, the active hydrogen containing polymer has hydroxyl, amino, mercapto, carboxylic acid, urethane, urea, carbamate moieties, or a mixture thereof and more preferably amino moieties, hydroxy moieties or a mixture thereof. Preferably, the active hydrogen containing polymer is a polyurethane having residual active hydrogen containing moieties or a polyol such as a polyether or polyester polyol. The polymer containing active hydrogen containing moieties may be blended with other polymers or additives. Preferably such polymers are found in a solid form and are elastomeric or plastic in nature.

Suitable polyols useful include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted alkylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. In general, polyether polyols may be prepared by polymerizing alkylene oxides in the presence of an active hydrogen-containing initiator compound.

Preferable alkylene oxides include ethylene oxide, propylene oxide, butylene oxides, styrene oxide, epichlorohydrin, epibromohydrin, and mixtures thereof. Preferable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, aliphatic and aromatic amines, and mixtures thereof.

Polyester polyols are also well-known in the art and may be prepared by reacting a polycarboxylic acid, or an ester or anhydride thereof with a polyhydric alcohol. Examples of preferable polycarboxylic acids include succinic acid, adipic acid, suberic acid, azelaic acid, sebacic acid, phthalic acid, isophthalic acid, maleic acid, trimellitic acid, fumaric acid and terephthalic acid. Examples of preferable anhydrides include phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride and glutaric acid anhydride., Mixtures of the polycarboxylic acids, esters and/or anhydrides described herein may be used. Examples of preferable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

The adhesive layer comprises one or more compounds containing one or more nitrile oxide moieties. The compounds having nitrile oxide moieties suitable for the practice of the present invention have hindered nitrile oxide moieties. Nitrile oxide moiety as used herein corresponds to the formula —CNO. In some embodiments the nitrile oxide containing compound may further contain other reactive groups such as active hydrogen containing groups as defined herein. In another embodiment the nitrile oxide containing compound may be a polynitrile oxide. The term "polynitrile oxide" is used herein to refer to a compound containing two or more nitrile oxide moieties per molecule. Preferably the nitrile oxide moieties are bound to aromatic rings. It is to be understood that the term "aromatic" includes heteroaromatic moieties such as pyridines, furans, thiophenes, and the like.

Each nitrile oxide is adjacent to at least one substituent that is 1) unreactive with nitrile oxide and 2) non-interfering with the reaction between the nitrile oxide groups and unsaturated groups, preferably olefinically or acetylenically unsaturated groups and the reaction of nitrile oxide groups or derivatives thereof with active hydrogen containing compounds. Preferably, the polynitrile oxide forms less than 10 percent, more preferably less than 5 percent, and most preferably less than 1 percent dimers in 30 days at room temperature.

Preferably the poly-nitrile oxides of the invention comprise compounds having the structure:

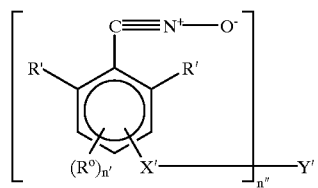

wherein each R' is independently $C_1$–$C_{12}$-alkyl, F. Cl, Br, I, O—$C_1$–$C_{12}$-alkyl, or S—$C_1$–$C_{12}$-alkyl; each R° is a substituent that does not spontaneously react with the nitrile oxide group; each n' is independently 0, 1, or 2; n" is an integer greater than 1; each X' is independently a bond or a connecting group; and Y' is a polyvalent radical containing an ether, ester, amide, amine, carbonate, ketone, urethane, Arleen, or thioether moiety; or each X' and Y' together are a bond connecting the benzene rings.

Examples of hindered aromatic polynitrile oxides include

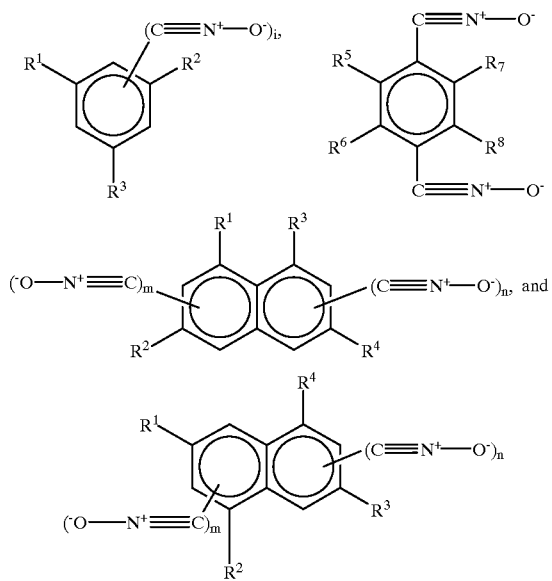

where $R^1$, $R^2$, and $R^3$, and $R^4$ are each independently H, R, halo, SH, SR, SOR, $SO_2R$, hydroxy, or OR, with the proviso that at least one of $R^1$, $R^2$, $R^3$, and $R^4$ that is adjacent to a nitrile oxide group is not H; $R^5$, $R^6$, $R^7$, and $R^8$ are each independently H, R, halo, S—H, SR, SOR, $SO_2R$, hydroxy, or OR, wherein R is a $C_1$–$C_{12}$ linear, branched, or cyclic alkyl group, preferably a $C_1$–$C_4$ linear or branched alkyl group, more preferably ethyl or methyl; or $R^5$ and $R^6$, or $R^7$ and $R^8$, together with the carbon atoms to which they are attached, form a benzene ring, wherein at least one of $R^5$ or $R^7$ is not H, and at least one of R6 or $R^8$ is not H; i is 2 or 3; m and n are each 0, 1, or 2, and n+m≧2, preferably 2 or 3.

Other examples of hindered aromatic polynitrile oxides include compounds represented by the following structures:

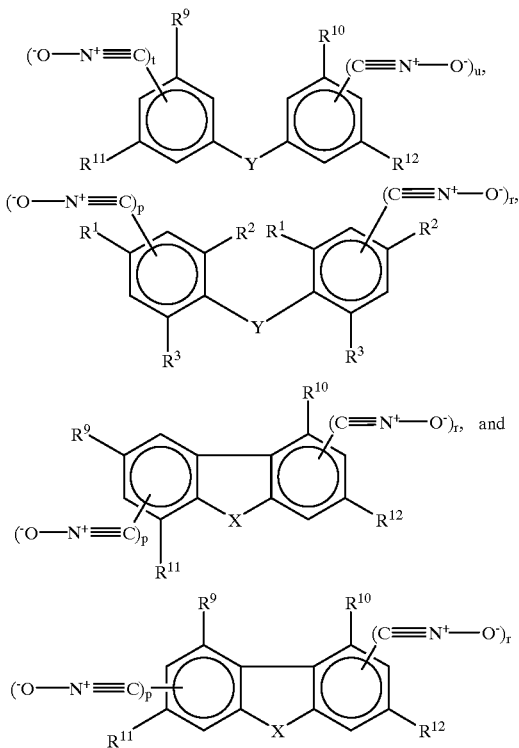

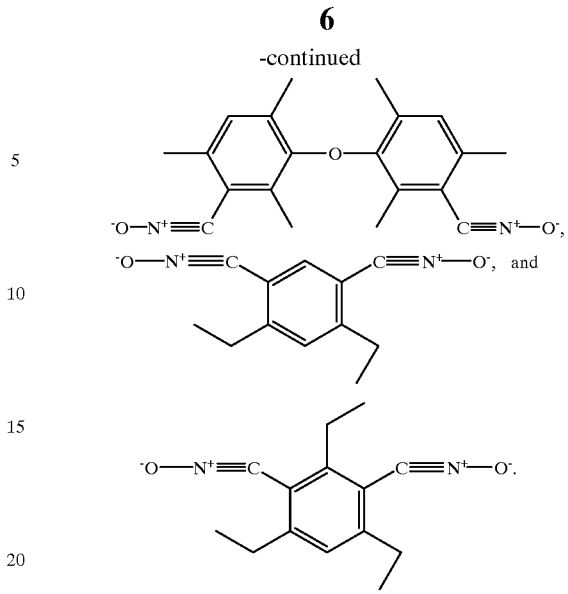

where $R^9$, $R^{10}$, $R^{11}$, and $R^{12}$ are each independently H, R, halo, SH, SR, SOR, SO$_2$R, hydroxy, or OR with the proviso that at least one of $R^9$ and $R^{11}$ is not H when a nitrile oxide group is adjacent to both $R^9$ and $R^{11}$, and at least one of $R^{10}$ and $R^{12}$ is not H when a nitrile oxide group is adjacent to both $R^{10}$ and $R^{12}$; m, p, and r are each 0, 1, or 2, and p+r≧2; X is CH$_2$, C(R)$_2$, carbonyl, O, S, SO, SO$_2$, NH, SO$_2$NH, SO$_2$NR, or NR; t is 1, 2 or 3 and u is 0, 1, 2, or 3; and t+u≧2; Y is a bond, CH$_2$, C(R)$_2$, carbonyl, O S, SO, SO$_2$, NH, NR, 9,9'-fluoreno, or phenylene.

Examples of specific hindered aromatic polynitrile oxides that are suitable for the practice of the present invention include the following compounds:

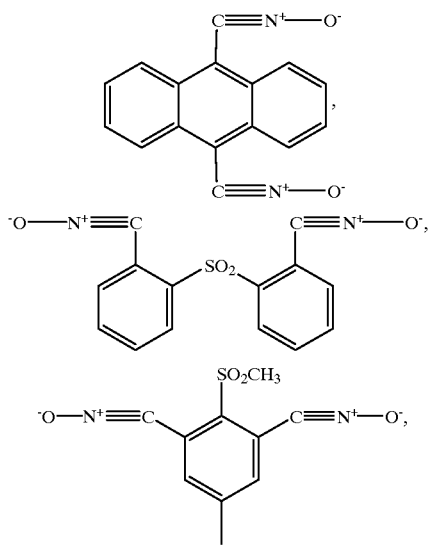

Stable aliphatic or cycloaliphatic polynitrile oxides can be prepared from a suitably functionalized aliphatic or cycloaliphatic polyaldehyde. The polyaldehyde can then be reacted with hydroxylamine to form the polyaldoxime, which can then be treated with bleach and caustic to form the desired aliphatic polynitrile oxide.

A suitably functionalized aromatic mononitrile oxide or monoaldehyde can be used to prepare a polynitrile oxide represented by the following formula:

$$\left[ \begin{array}{c} C \equiv N^+ - O^- \\ R' \diagup \diagdown R' \\ (R^\circ)_{n'} \diagdown \diagup X' \end{array} \right]_{n''} - Y'$$

wherein each R' is independently C$_1$–C$_{12}$-alkyl, F, Cl, Br, I, O—C$_1$–C$_{12}$-alkyl, or S—C$_1$–C$_{12}$-alkyl; more preferably ethyl, methyl, n-propyl, isopropyl, n-butyl, isobutyl, methoxy, ethoxy; most preferably ethyl, methyl, or methoxy; each R° is a substituent that does not spontaneously react with the nitrile oxide group, preferably ethyl, methyl, n-propyl, isopropyl, n-butyl, isobutyl, methoxy, ethoxy, F, Cl, Br, or I; each n' is independently 0, 1, or 2; n' is an integer greater than 1, preferably 2, 3, or 4, more preferably 2 or 3, and most preferably 2; each X' is independently a bond or a connecting group such as an alkylene, cycloalkylene, or arylene group, more preferably a bond, a methylene group, or a phenylene group; and Y' is a polyvalent radical, preferably a divalent radical, containing an ether, ester, amide, carbonate, ketone, urethane, arylene, or thioether group; or each X' and Y' together are a bond connecting the benzene rings.

Suitably functionalized hindered aromatic mononitrile oxides or monoaldehydes preferably include 2,6-disubstituted benzonitrile oxides or benzaldehydes having an ester, acetate, hydroxy, epoxy, fluorine, chlorine, bromine, or iodine group connected directly to the benzene ring or indirectly through a connecting group. Preferably, the suitably functionalized 2,6-disubstituted benzonitrile oxide or benzaldehydes is represented by the following structure:

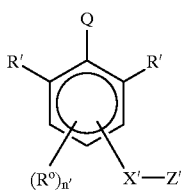

where R', R°, X', and n' are previously defined; Q is —C≡N³⁰ O— or —CHO; and Z' is an ester, acetate, amine, hydroxy, epoxy, amide, keto, aldehyde, fluorine, chlorine, bromine, or iodine group.

For example, 3-hydroxymethyl-2,4,6-trimethylbenzonitrile oxide or its corresponding benzaldehyde precursor can be: (a) transesterified with a diester or condensed with a diacid chloride to form a dinitrile oxide diester; (b) reacted with phosgene to form a dinitrile oxide containing a carbonate group; (c) reacted with a diisocyanate to form a dinitrile oxide containing urethane groups; (d) reacted with a dibenzyl chloride to form a dinitrile oxide containing two ether groups; (e) reacted with a diglycidyl ether to form a dinitrile oxide containing ether groups and hydroxy groups; and (f) reacted with an acid to form a difulmido dibenzyl ether.

Similarly, the suitably functionalized hindered aromatic nitrile oxide can be reacted with a second suitably functionalized hindered aromatic nitrile oxide to form a dinitrile oxide. For example, 3-hydroxymethyl-2,4,6-trimethylbenzonitrile oxide can be reacted with 3-chloromethyl-2,6-dimethylbenzene nitrile oxide to form a bis(nitrile oxide) dimethyl ether.

Polynitrile oxides having a functionality of greater than 2 (for example, a trinitrile oxide) can readily be prepared by reacting a dinitrile oxide with a compound having more than 2 unsaturated sites. For example, 2,4,6-triethylbenzene-1,3-dinitrile oxide can be reacted with trimethylol propane triacrylate to form the following trinitrile oxide:

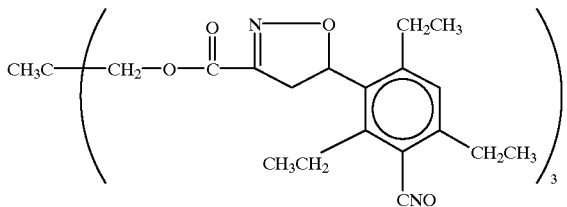

In another embodiment of the invention a cycloaliphatic nitrile oxide represented by the formula may be used in the invention:

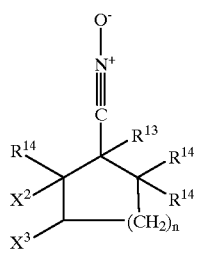

wherein $R^{13}$ and each $R^{14}$ are independently hydrogen, $C_1$–$C_{12}$ alkyl, or halo; $x^2$ and $X^3$ are each independently halo, hydroxyl, or together with the carbon atoms to which they are attached, form an epoxy group, preferably with the proviso that at least one of $X^2$ and $X^3$ is not halo; and n is 1 or 2, preferably 2. Preferably, each $R^{14}$ is independently hydrogen, methyl, ethyl, chloro, or bromo; more preferably ethyl or methyl, and most preferably methyl. Preferably, $R^{13}$ is hydrogen, methyl, or ethyl, more preferably hydrogen. Preferably, $X^2$ and $X^3$ are each independently hydroxy, chloro, bromo, or together with the carbon atoms to which they are attached form an epoxy group. More preferably, one of $X^2$ and $X^3$ is chloro, and the other of $X^2$ and $X^3$ is hydroxy, or $X^2$ and $X^3$ together with the carbon atoms to which they are attached form an epoxy group.

The nitrile oxide adhesive can be contacted with the polymeric layers neat, in a solvent or dispersant. The use of a solvent or a dispersant is preferred to enhance wet out of the adhesive layer on the surfaces of the polymeric layers. Any solvent or dispersant which dissolves or disperses the nitrile oxide and does not degrade the polymeric layers may be used. Preferably the solvent or dispersant is volatile at the conditions at which the adhesive reacts with the layers. Preferably the solvents or dispersants do not contain reactive moieties which interfere with the ability of the nitrile oxide to perform the desired function. Preferable solvents include haloalkanes and cyclic ethers. More preferred solvents include methylene chloride and dioxane. It is preferable to use water as a dispersant for the nitrile oxide. The nitrile oxide is dissolved or dispersed in a solvent at as high a solids level as possible to achieve the desired results. Preferably the solids level is about 20 percent by weight or greater, more preferably about 30 percent by weight or greater, even more preferably about 40 percent by weight or greater and most preferably 50 percent by weight or greater. Preferably the solids level is 70 percent by weight or less and more preferably 60 percent by weight or less.

The laminate structures of the invention are prepared by contacting the polymeric layers at the point where the layers are to be bonded. The polymeric layers to be contacted can be either selected from polymers containing olefinic unsaturation or polymers containing active hydrogen atoms or both. The nitrile oxide and the polymeric layers can be contacted in any sequence. Preferably the polymeric layers contacted comprise at least one polymeric layer containing olefinic unsaturation and at least one layer comprising a polymer containing active hydrogen atoms. Preferably the nitrile oxide is contacted with the polymer containing active hydrogen atoms before being contacted with the polymeric layer containing olefinic unsaturation because the nitrile oxide reacts much faster at ambient conditions with the latter than the former. Thereafter the contacted layers are exposed to temperatures at which the nitrile oxide moieties are reactive with the substrate layers, such as the active hydrogen containing moieties Preferably the contacted layers are exposed to temperatures of 80° C. or greater, more preferably 100° C. or greater and most preferably 150° C. or greater. The upper limit on the temperature to which the layers are exposed after contacting is that temperature at which one or more of the polymeric layers undergo phase transition. Preferably the layers are exposed to temperatures of 200° C. or less, more preferably 180° C. or less and most preferably 170° C. or less. Preferably the layers are subjected to pressure to improve the wet out of the adhesive layer to the contacted areas. Pressure is typically applied by mechanical means, such as by a press. Preferably the pressure applied is 5000 psi (34.5 mPa) or greater, more preferably 10,000 psi (79 mPa)or greater and most preferably 20,000 psi (158 mPa) or greater. Preferably the pressure applied is 50,000 psi (345 mPa) or less, more preferably 30,000 psi (237 mPa) or less and most preferably 25,000 psi (172 mPa) or less. The layers are exposed to the temperatures and applied pressures for a time sufficient to result in the reaction of nitrile oxide moieties, or derivatives thereof, with both polymeric layers such that the layers are bound together. Preferably such time is about 1 minute or greater and more preferably about 10 minutes or greater. Preferably such time is about 30 minutes or less and more preferably about 20 minutes or less.

It may be desirable to clean the surfaces of the polymeric layers to remove impurities or debris from the surfaces prior to the contacting. Such cleaning can be performed using techniques well known in the art. Preferably the surfaces are cleaned with a commmon solvent which does not degrade the surface cleaned. Preferable solvents include chlorinated alkanes, such as methylene chloride; ketones, such as acetone; aromatic hydrocarbons, such as benzene and toluene; lower alkanols, such as methanol, ethanol, isopropanol; cyclic ethers, such as dioxane; and the like.

In a preferred embodiment one polymeric layer is a polyurethane and the other layer is an uncured natural rubber composition. In this embodiment the layers are contacted and then subjected to the normal rubber vulcanization process. During the vulcanization process the polynitrile oxide reacts to adhere the two surfaces together.

The layers of the laminates can comprise any shape or thickness desired. The shapes and thicknesses of the layers are not an essential part of the invention.

The laminates exhibit good adhesion strengths. Preferably the laminates exhibit peel strengths, according to ASTM test No. D-413, of 11 pounds or greater and more preferably 13 pounds or greater.

SPECIFIC EMBODIMENTS OF THE INVENTION

The following Examples are included for illustrative purposes and do not limit the scope of the claims. All parts and percentages are based on a weight unless otherwise stated.

EXAMPLE 1

A polyurethane elastomer having an isocyanate content of 6.5 percent was prepared according to the following procedure. 5.7 lbs. (2.6 kg) of Voranol EP 1900 polyol (propylene glycol initiated polyol having propylene oxide and ethylene oxide blocks, with an equivalent weight of 2025) is heated to 70° C. and poured into an open top one gallon container. To the polyol is added 0.15 g of 85 percent phosphoric acid to adjust the basicity (CPR). 1.8 lbs of liquid Isonate 125M liquid pure methylene diisocyanate (MDI) at a temperature of 65° C. was added to the polyol mixture. The mixture was stirred rapidly for 5 minutes with the aid of a drill mixer. The container is flushed with nitrogen, closed and heated to 70° C. for 5 hours. The container was shaken for several minutes once per hour during heating. The percent isocyanate is determined at the end of heating by reacting a sample of the prepolymer with dibutylamine and back titrating the residual amine. The prepolymer was then chain extended with a mixture of 67 percent diethylenetoluenediamine (DETDA) and 33 percent dioctylphthalate(DOP). The machine used was a HI-TECH Sure Shot 30 RIM machine. The polymer to chain extender ratio was 6.17:1. The mold temperature was 160° C. The prepolymer temperature was 145° C. The chain extender temperature was 110° C. The plaque formed was post cured for 30 minutes at 120° C. The polyurethane elastomer plaque was a 95 Shore A hardness plaque of 5 mm thickness.

A rubber composition and the polyurethane plaque were adhered together using a polynitrile oxide in the following example. The rubber composition comprises 70 parts of a natural rubber, 30 parts of butylene rubber, 50 parts of GFP Carbon black (N660), 1 part Agerite Superlite alkylated/arylated phenols, 8 parts aromatic oil, 3 parts Arofene 8318 SP 1068 phenol formaldehyde resin, 3 parts zinc oxide, 1 part stearic acid, 1 part NCBS Duraxn-cyclohexyl benzothiazole-2-sulfenamide, 0.4 parts of MBTS 2,2'-dithiobisbenzothiazole, 2 parts sulfur. The total parts in the composition was 169.9. 1,2-bisnitrileoxy-2,4,6-triethylbenzene (TON-2), a solid, was dissolved in methylene chloride at 50 percent by weight to give a clear yellow, low viscosity product. The TON-2 solution was spread onto the polyurethane elastomer plaque, the methylene chloride was allowed to evaporate and a layer of a 5 mm thick non-vulcanized rubber was laid on the top of the elastomer plaque with the TON-2 between the two layers. A 4 mm thick steel plate was placed around the rubber to prevent it from sagging further in the press. The composite was placed between 2 Teflon fluorocarbon coated steel plates. This composite was put in a press at 150° C. for 20 minutes. The pressure applied to the composite by the press was 20,000 psi (79 mPa). The same composite without the TON-2 was also tested as a control.

At demold, the control without TON-2 showed no adhesion at all and the two parts just peeled off during the demolding. The composite with the TON-2 showed good adhesion between the rubber layer and the polyurethane elastomer layer. In an attempt to separate the 2 layers, the delamination occurred in an adhesive way with some rubber still bonded to the polyurethane plaque with the rubber layer showing cohesive failure.

Adhesion testing between the polyurethane and rubber samples was carried out by placing the rubber and polyurethane elastomer on either side of 0.0045 inch (0.011 cm) thick piece of mylar sheet with five eight mm wide test windows cut into it. The surfaces of the rubber and polyurethane were wiped clean with a cloth wetted with toluene. The toluene is allowed to evaporate before proceeding. The TON-2/methylene chloride solution was painted on the surface of the polyurethane elastomer exposed in the adhesion template with a small brush. The methylene chloride was allowed to evaporate leaving behind a coating of solid TON-2. The rubber sample is placed on top of the polyurethane elastomer and mylar film. The composite is then placed between two Teflon coated metal plates separated by one eighth inch thick metal spacer. The composite is heated to 150° C. under 20,000 psi (158 mPa) pressure for twenty minutes. After pressing, the polyurethane/rubber composite was removed from the plates and allowed to cool and cure for twenty four hours at room temperature prior to adhesion testing.

Adhesion testing was carried out by the use of a 180° peel test using a Model 1125 Instron load frame. The test is carried out at 25° C. on five samples, using a crosshead speed of 20.0 in/minute (50.8 cm/minute). The five samples were tested successively, with the average peak load measured as the degree of adhesion. One grip was used to hold the rubber, while the polyurethane elastomer was held in the other grip. The two adhered layers were then pulled apart from one another at an 90° angle. In most cases where adhesion is high between the layers, cohesive failure of the rubber layer bonded to the polyurethane is seen.

Initial adhesion testing of rubber adhered to a polyurethane elastomer using TON-2 dissolved in methylene chloride at 25 and 50 weight percent gave peak load strengths of 8.49 and 9.25 lbs. respectively. All of the samples showed cohesive failure of the rubber as the rubber and polyurethane were pulled away from one another. No evidence of failure of the rubber to polyurethane adhesion bond was observed.

A mylar sheet similar to the one used before was prepared with cut out windows of 5, 10 or 15 mm wide. Each mylar sheet contained two windows of a width. The mylar sheet was placed between the green rubber and the polyurethane elastomer and a 50 percent by weight solution of TON-2 was applied to the polyurethane elastomer visible through the windows. The composite was cured at 150° C. and 20,000 psi (158 mPa) for 20 minutes. The composite was then aged for 24 hours and the specimens were cut out for peel testing. The following results were obtained:

| Window Width | Peak Load (Lbs) | Peak Load (kg) |
| --- | --- | --- |
| 5 mm | 14.8 | 6.73 |
| 10 mm | 21.2 | 9.63 |
| 15 mm | 33.0 | 15 |

When this experiment was repeated using a mylar sheet with windows 100 mm×8 mm wide, peak load adhesion values of 15.5 lbs (7.05 kg) were observed.

EXAMPLE 2

Example 1 was repeated with two polyurethane plaques having TON-2 between them and two polyurethane plaques having no TON-2 between them. The plaques with TON-2 between them adhered well while the two plaques without TON-2 did not adhere to one another.

EXAMPLE 3

A sample of green rubber was bonded to a portion of polyurethane elastomer prepared from polytetramethylene glycol (PTMEG) and MDI (6.5 percent NCO, chain extended with 50 percent DETDA in DOP). The two elastomers were adhered using a 50 weight percent solution of TON-2 in methylene chloride using the same conditions described earlier. The PTMEG is known to contain zero levels of unsaturation.

Qualitative observations of the adhesion between the polyurethane elastomer and cured rubber were similar to those of the green rubber and previously described polyurethane elastomer.

EXAMPLE 4

The unsaturation level of the VORANOL EP-1900 polyol was reduced from 0.07 to 0.006 meq/gm by stoichiometric reaction the polyol unsaturation with TON-2 bisnitrile oxide. The unsaturation groups present in the polyol are reacted with nitrile oxide to form isoazoline groups to yield two functional diol. The reaction is carried out via the method described in US patent application Ser. No. 677,749 filed Jul. 10, 1996 now U.S. Pat. No. 5,736,748. The reduced unsaturation polyol was used to prepare a 6.5 percent NCO MDI elastomer (chain extended with 50 percent DETDA in DOP) using the process described in Example 1.

Adhesion testing to green rubber was carried out using the same conditions described earlier and a peak adhesion load level of 16.3 lbs. (7.41 kg) was measured on the rubber/polyurethane composite.

What is claimed is:

1. A laminate structure comprising two layers selected from one or both of
   a) a polymeric layer containing olefinic unsaturation, and,
   b) a polymeric layer having active hydrogen atoms; wherein,
   c) an adhesive layer derived from one or more compounds having one or more nitrile oxide moieties is located between the layers;
   wherein a portion of the nitrile oxide moieties, or a derivative thereof, of the adhesive layer is reacted with olefinic unsaturation of layer a) the active hydrogen atoms of layer b, or both.

2. The laminate of claim 1 wherein one layer is a) a polymeric layer containing olefinic unsaturation and the other layer is b) a polymeric layer having active hydrogen atoms.

3. A laminate according to claim 2 wherein the laminates exhibit peel strengths according to ASTM Test Number D-413 of about 11 pounds or greater.

4. The laminate of claim 1 wherein layer a) comprises a rubber composition, neoprene, a styrene block copolymer, ethylene propylene terpolymer, styrene-butyl rubber, polychloroprene or mixtures thereof.

5. The laminate of claim 4 wherein layer a) contains terminal olefinic unsaturation.

6. The laminate of claim 5 wherein layer b) contains hydroxyl, amino, mercapto, carboxylic acid, urethane, urea, carbamate moieties or mixtures thereof.

7. The laminate of claim 6 wherein layer b) contains hydroxyl moieties, amino moieties or mixtures thereof.

8. The laminate of claim 7 wherein the compound containing nitrile oxide moieties is represented by the structure:

where x is an integer greater than 1, G is an aromatic, aliphatic, or cyclic aliphatic group having at least one substituent adjacent to each nitrile oxide group, the substituent characterized by inhibiting dimerization of nitrile oxide, and being non-interfering with a reaction between nitrile oxide groups and unsaturated groups.

9. The laminate of claim 7 wherein layer a) is a rubber composition and layer b) is a polyurethane.

* * * * *